United States Patent
Phillips et al.

(10) Patent No.: US 8,123,076 B2
(45) Date of Patent: Feb. 28, 2012

(54) APPLIANCE CONTROLLER SYSTEM FEATURING AUTOMATIC BEVERAGE DISPENSER SHUTOFF SYSTEM

(75) Inventors: David L. Phillips, Santa Ana, CA (US); William B. McDonough, Huntington Beach, CA (US); Nikhil Jitendra Gandhi, Anaheim, CA (US); Rodolfo Aguirre, Irvine, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 912 days.

(21) Appl. No.: 12/057,961

(22) Filed: Mar. 28, 2008

(65) Prior Publication Data
US 2008/0251534 A1    Oct. 16, 2008

Related U.S. Application Data

(60) Provisional application No. 60/923,958, filed on Apr. 16, 2007.

(51) Int. Cl.
*B67D 1/00* (2006.01)

(52) U.S. Cl. ......................... 222/66; 137/113

(58) Field of Classification Search ............ 222/64, 222/61, 55, 59, 66, 394–399, 400.4, 400.7, 222/1; 137/113, 557
See application file for complete search history.

(56) References Cited

U.S. PATENT DOCUMENTS

| | | | |
|---|---|---|---|
| 2,088,491 A | 7/1937 | Smith | |
| 2,290,049 A | 1/1939 | Hildebrecht | |
| 2,496,467 A | 5/1944 | Griffith | |
| 3,537,616 A * | 11/1970 | Diebel et al. | 222/66 |
| 3,614,278 A | 10/1971 | Di Noto, Jr. | |
| 3,756,464 A * | 9/1973 | Fuqua | 222/57 |
| 3,855,480 A | 12/1974 | Striker et al. | |
| 4,265,598 A | 5/1981 | Brand | |
| 4,560,089 A * | 12/1985 | McMillin et al. | 222/14 |
| 4,632,275 A * | 12/1986 | Parks | 222/25 |
| 4,972,883 A | 11/1990 | Hassell et al. | |
| 5,062,443 A * | 11/1991 | Maric | 137/113 |
| 5,082,143 A * | 1/1992 | Schramm, Jr. | 222/66 |
| 5,172,089 A | 12/1992 | Wright et al. | |
| 5,730,323 A * | 3/1998 | Osborne | 222/55 |
| 6,227,806 B1 | 5/2001 | Libfeld | |
| 6,766,835 B1 | 7/2004 | Fima | |
| 6,868,986 B1 | 3/2005 | Arnold | |

OTHER PUBLICATIONS

PCT Search Report International Application No. PCT/US08/60039.

* cited by examiner

*Primary Examiner* — Lien Ngo

(57) ABSTRACT

An appliance controller is provided featuring one or more modules configured for providing power to an appliance that receives fluid from a fluid supply system, for receiving a fluid supply system signal indicating that the fluid is not being provided to the appliance and for disconnecting the power to the appliance. The one or more modules may take the form of an appliance controller circuit having a first circuit part configured for providing power to an appliance that receives fluid from a fluid supply system; and a second circuit part configured for receiving a fluid supply system signal indicating that the fluid is not being provided to the appliance and disconnecting the power to the appliance. The appliance controller may form part of an appliance controller system having appliances, appliance controllers and the fluid supply system.

12 Claims, 5 Drawing Sheets

Appliance Controller System

FIG. 1a : Appliance Controller System

FIG. 1b: Appliance Controller System

FIG. 2a: Appliance Controller Circuit

FIG. 2b: Appliance Controller Circuit

*FIG. 3* : Controller System

APPLIANCE CONTROLLER SYSTEM FEATURING AUTOMATIC BEVERAGE DISPENSER SHUTOFF SYSTEM

CROSS-REFERENCE TO RELATED APPLICATIONS

This application claims benefit to patent application Ser. No. 60/923,958, filed 16 Apr. 2007, which is hereby incorporated by reference in its entirety.

BACKGROUND OF THE INVENTION

1. Field of Invention

This invention relates to an appliance controller; and more particularly to an appliance controller having an automatic beverage dispenser shutoff system (ABDSS) for an automatic beverage dispenser system.

2. Description of Related Art

In the prior art, a known dispensing system is connected to wall power and when the water is exhausted the unit or appliance still attempts to run as per its function. One shortcoming of this known dispensing system is that no water supply means the dispensing system can overheat causing elements to burn out, and ruin the system. There is a need in the art to solve this problem.

In general, other patents are known in the art disclosing techniques for sensing water or liquid levels to protect equipment.

For example, U.S. Pat. No. 2,088,491 discloses a low water and pressure control device for a boiler. The device is a mechanical device that senses when the water level falls below a predetermined level, and opens or closes a valve to add water to the boiler. The device receiving water from the boiler is not turned off based on this technique.

U.S. Pat. No. 2,290,049 discloses a safety apparatus for a hot water heater that turns off the fuel supply using a solenoid valve when the temperature gets to high using a magnetic switch. The device receiving water from the hot water heater is not turned off based on this technique.

U.S. Pat. No. 2,496,467 discloses a pump shutoff when the fluid level is low, but does not turn off the device receiving the fluid from the pump.

U.S. Pat. No. 3,614,278 discloses an alarm circuit for shutting off an oil burner when the water level is low; however, no device receiving the hot water from the oil burner is shut off.

U.S. Pat. No. 4,265,598 discloses a technique for de-actuating swimming pool equipment, e.g. pump, when the pool water is low.

U.S. Pat. No. 5,172,089 discloses a pool pump fail safe switch for turning off a pump when the water level in the pool falls below a certain level using a technique based on a float having a permanent magnet incased therein. The device (i.e. appliance) receiving the pumped fluid (i.e. the pool) is not turned off.

U.S. Pat. No. 6,227,806 discloses a lift pump guard using a technique based on two different current flows depending on if the lift pump is pumping together with a selectively actuatable bistable relay. The pump is turned off, not the device receiving the fluid.

U.S. Pat. No. 6,766,835 discloses a hot water tank monitoring system that turns off the energy supply to the hot water tank when the sensed pressure thereof exceeds a certain level. The technique does shut off any device receiving the hot water from the tank.

However, none of these other patents teaches or suggests anything about sensing a fluid level signal in a fluid supply system providing fluid to an appliance, unit or other suitable device, and automatically turning off the appliance, unit or device based on the sensed fluid level signal.

SUMMARY OF THE INVENTION

The present invention provides a new and unique appliance controller featuring one or more modules configured for providing power to an appliance that receives fluid from a fluid supply system, for receiving a fluid supply system signal indicating that the fluid is not being provided to the appliance, and for disconnecting the power to the appliance.

The one or more modules may take the form of an appliance controller circuit having a first circuit part configured for providing power to an appliance that receives fluid from a fluid supply system; and a second circuit part configured for receiving a fluid supply system signal indicating that the fluid is not being provided to the appliance and disconnecting the power to the appliance.

The appliance controller circuit may also include a third circuit part configured for daisy chaining the appliance controller circuit to another appliance controller circuit coupled to another appliance. In operation, the third circuit part may also be configured to respond to one fluid supply system signal and provide a daisy-chained fluid supply system signal to the another appliance controller. The appliance controller circuit may also include a fourth circuit part configured to provide an alarm indicating that the appliance has been disconnected.

The present invention also provides an appliance controller system featuring such a fluid supply system in combination with such an appliance controller configured to provide the power to the appliance for turning the appliance on and off. In operation, the fluid supply system may be configured to provide fluid from the fluid supply to the appliance, to sense that the fluid supply is below a predetermined threshold and to provide the fluid supply system signal indicating that no fluid is being provided to the appliance. The appliance controller may also be configured to respond to the fluid supply system signal and disconnect the power to the appliance. Consistent with that set forth above, the appliance controller may also include such an appliance controller circuit having such a first circuit part configured for providing the power to the appliance; and such a second circuit part configured for receiving the fluid supply system signal and disconnecting the power to the appliance. The appliance controller circuit may also include such a third circuit part configured for daisy chaining the appliance controller circuit to such another appliance controller circuit coupled to such another appliance, where the third circuit part may be configured to respond to one such fluid supply system signal and provide such a daisy-chained fluid supply system signal to such another appliance controller. The appliance controller circuit may also include such a fourth circuit part configured to provide such an alarm indicating that the appliance has been disconnected. The fluid supply system may include a sensor that responds to the fluid supply system being below the predetermined threshold and provides the fluid supply system signal. The appliance controller system may also include a plurality of appliance controllers, each coupled to a respective appliance, where the plurality of appliance controllers may be daisy chained together so that only one appliance controller is connected to the fluid dispensing system. In this embodiment, the one appliance controller may be responsive to one fluid supply system signal and provide a daisy-chained fluid supply system signal to a next appliance controller.

The present invention also provides a method featuring steps for providing power to the appliance that receives fluid from the fluid supply system; receiving the fluid supply system signal indicating that the fluid is not being provided to the appliance; and disconnecting the power to the appliance.

The present invention also provides a method featuring steps for providing fluid from the fluid supply to the appliance; responding to the first signal indicating that the fluid supply is below the predetermined threshold and providing the second signal indicating that no fluid is being provided to the appliance; and responding to the second signal by disconnecting power to the appliance.

In effect, the present invention provides both a new and unique method and apparatus for sensing the fluid level signal in the fluid supply system providing fluid to the appliance or other suitable device, and automatically turning off the appliance or device based on the sensed fluid level signal.

The present invention provides an important contribution to the state of the art by reducing the likelihood that an appliance will continue to operate when fluid being dispensed is no longer being provided to the appliance.

DESCRIPTION OF THE INVENTION

Figure 1A:
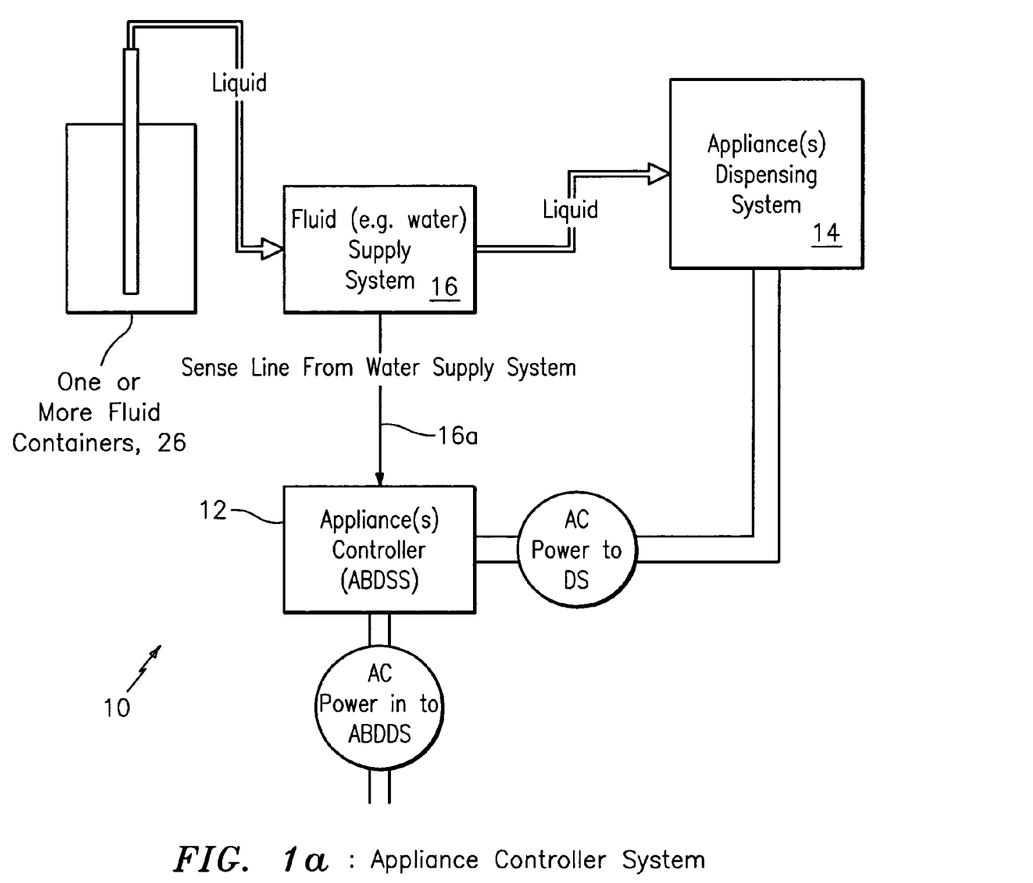
FIG. 1a is a block diagram of an appliance controller according to some embodiments of the present invention.

FIG. 1a

Figure 1B:
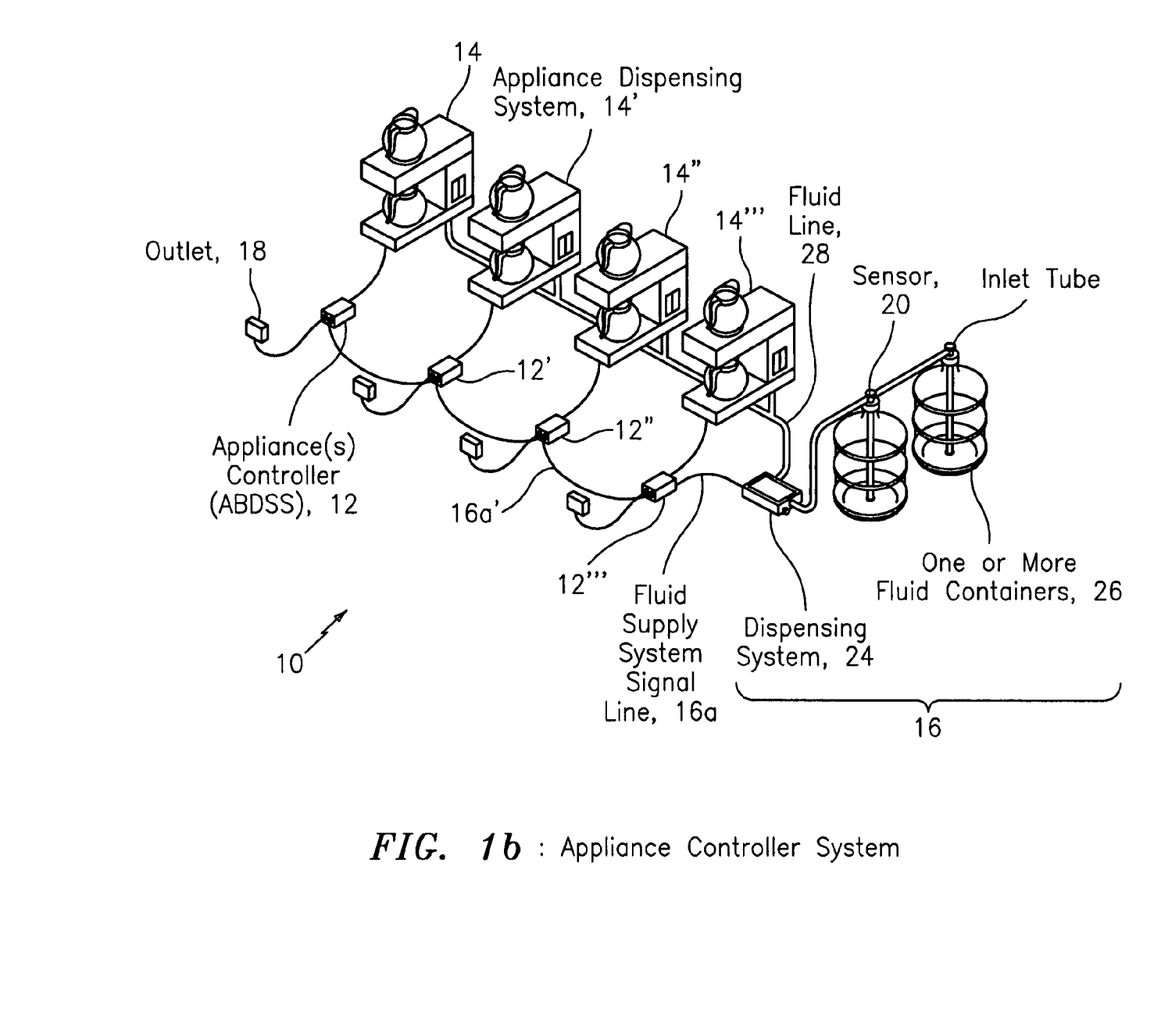
FIG. 1b is a diagram of one particular application of the appliance controller in FIG. 1a according to some embodiments of the present invention.

FIGS. 1a and 1b show an appliance controller system generally indicated as 10 having a new and unique appliance controller 12 that features an appliance controller having one or more modules configured for providing power to an appliance dispensing system (aka appliance) 14 that receives fluid from a fluid supply system 16, for receiving a fluid supply system signal along line 16a indicating that the fluid is not being provided to the appliance 14, and for disconnecting the power to the appliance 14.

The one or more modules may take the form of an appliance controller circuit 50 or 60 shown in FIG. 2a or 2b respectively as described below that include a first circuit part configured for providing power to the appliance 14 that receives fluid from the fluid supply system 16; and a second circuit part configured for receiving the fluid supply system signal along line 16a indicating that the fluid is not being provided to the appliance 14 and disconnecting the power to the appliance 14. The appliance controller circuit 50 or 60 may also include a third circuit part configured for daisy chaining the appliance controller circuit 50 or 60 to another appliance controller 12', 12",12'" coupled to another appliance 14', 14", 14'". In operation, the third circuit part may be configured to respond to one fluid supply system signal 16a and provide a daisy-chained fluid supply system signal 16a' to the another appliance controller 12", as shown in FIG. 1b. The appliance controller circuit may also include a fourth circuit part configured to provide an alarm indicating that the appliance 14 has been disconnected.

In operation, the appliance controller 12 functions as an automatic beverage dispenser shutoff system (ABDSS) that monitors, e.g., the water supply system, and prevents the appliance dispensing system 14 from running dry by removing power to the appliance dispensing system 14 until the water supply is reestablished in the water supply system 16.

As shown in FIG. 1a or 1b, the appliance controller 12 is connected to AC power from a wall or other power source 18. The appliance controller 12 is then connected to a float sensor or other suitable sensor 20 in the water supply system 16. The appliance dispensing system 14 is then plugged into the appliance controller 12 using a suitable plug in connection. The appliance controller 12 then monitors the appliance dispensing system 14 and the water supply system 16. In the event the water supply is exhausted in the water supply system 16, then the appliance controller 12 then shuts the power to the appliance dispensing system 14, in turn protecting the appliance dispensing system 14 from overheating, running dry etc.

The appliance dispensing systems like 14 are known in the art and the scope of the invention is not intended to be limited to any particular type or kind thereof either now known or later developed in the future. By way of example only, the appliance 14 is shown as a coffee dispensing device, but may take the form of other dispensing systems for other types or kinds of fluids.

The fluid supply system 16 is known in the art and the scope of the invention is not intended to be limited to any particular type or kind thereof either now known or later developed in the future. By way of example only, the fluid supply system 16 may take the form of the fluid supply system disclosed in patent application Ser. No. 12/072,503, filed on 25 Feb. 2008, which is hereby incorporated by reference in its entirety. As shown in FIG. 1a or 1b, the fluid supply system 16 may include a dispensing system 24 that receives liquid or fluid from one or more containers 26, provides the liquid or fluid along fluid line 28 to the one or more appliances 14, 14', . . . , and provides the fluid supply system signal along line 16a indicating that the fluid is not being provided to the appliance 14. The dispensing system 24 is known in the art, and the scope of the invention is not intended to be limited to the manner or technique in which it is implemented. The fluid supply system 16 may also include an inlet tube 30 for drawing the liquid or fluid from one of the containers 26.

FIG. 1b

The appliance controller 12 monitors the absence or presence of fluid to a preset threshold in a reservoir or container 26 and prevents the appliance 14 from performing non-desired application by removing/applying power to the appliance 14 until the level threshold is reestablished.

The appliance controller 12 is introduced such that it may be electrically connected to an appliance 14 system(s) via any means of transponding a signal from any sensing interface(s) either now known or later developed in the future.

The appliance controller 12 allows for connecting one appliance 14 to a female outlet provided on the controller 12.

In operation, the applicable sensor 20 sends a signal to the controller 12 as long as the level inside the reservoir(s) or containers 26 is at a preset threshold value. Controller 12 shall, by means of circuit design shown in FIG. 2a or 2b, and with the help of firmware, turn ON/OFF the appliance 14 attached on the female outlet. Controller 12 shall also sample the ON/OFF signal to assure that it is not a nuisance signal.

After the "ON/OFF" signal is sent to the controller 12, a separate output signal such as an alarm can be turned on or off as needed.

In the case when the dispensing system 24 is not connected to the controller 12, there will be no power to the appliance 14 connected to the controller 12.

The sensing device 20 is typically be connected to a separate electrical power source.

The controller 12 typically will not operate if it is not connected to appropriate input power 18.

The controller 12 may indicate the presence of input power, such as an illuminated LED.

Figure 2A:
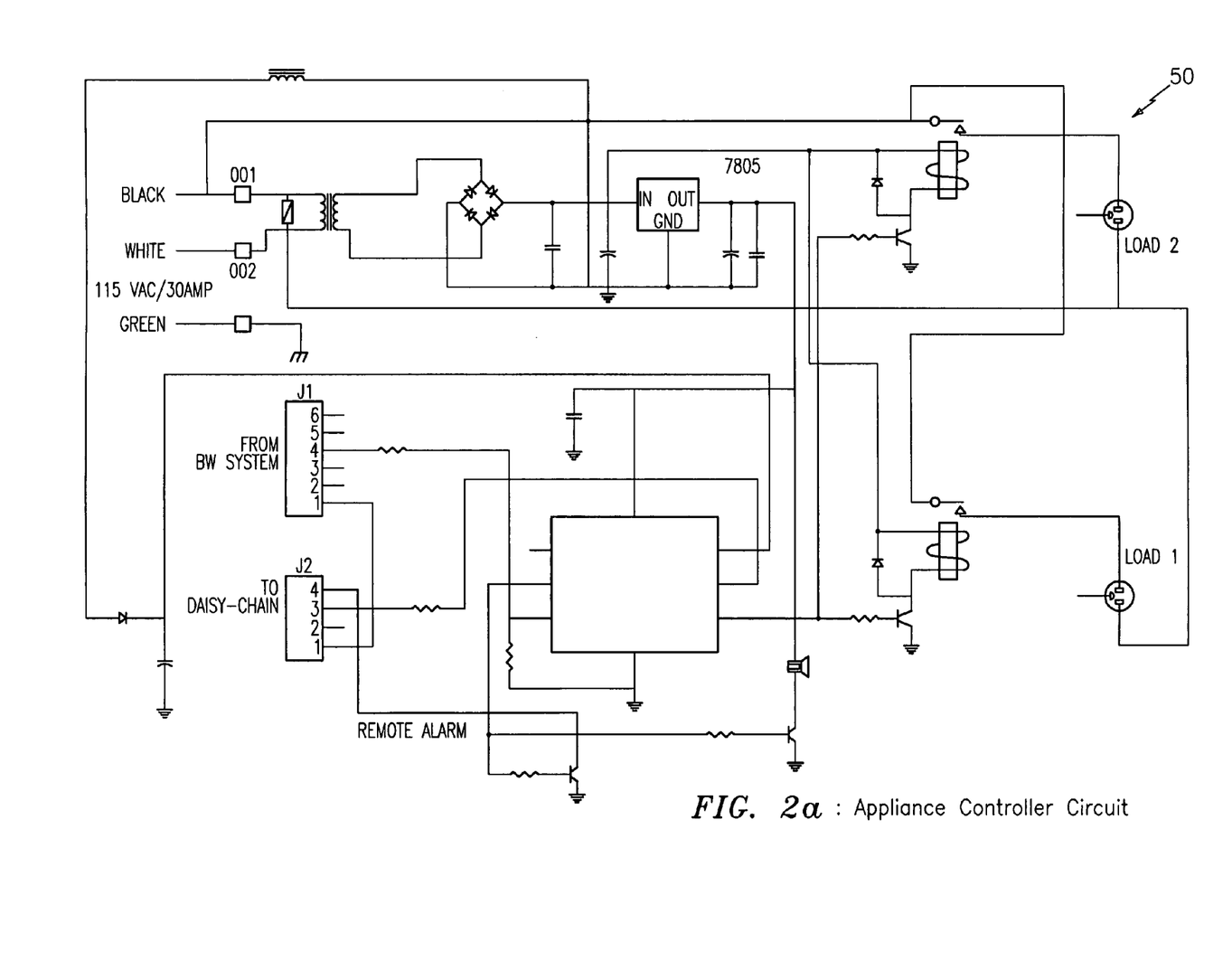
FIG. 2a is a circuit diagram of a controller module according to some embodiments of the present invention that forms part of the appliance controller shown in FIG. 1a or 1b.

FIG. 2a

FIG. 2a shows a schematic of one example of a circuit module for implementing the functionality of the appliance controller.

As shown, the circuit module is powered from 117 VAC 50/60 HZ via a high isolation power transformer TR1. Varistor TZ1 protects the circuit from high voltage incoming transients on the primary power side. Transformer TR1 steps the voltage down to 18 VAC on the secondary side. Bridge rectifier BR1 converts this to approximately 20 VDC as filtered by capacitors C1 and C2. This voltage is applied directly to the coils of relays RY1 and RY2 and also to the input of a voltage regulator U2. The voltage regulator U2 produces a low voltage output of 5V to power the microcontroller U1 and other logic.

Microcontroller U2 is a small 8-bit 8-pin device such as the Microchip Technology PIC12F615 and forms the intelligent heart of the control. When power is applied to the system, it initializes with relays RY1 and RY2 OFF. It activates the alarm Piezo buzzer PZ1 via transistor Q3 to a give a one-second audible ON tone to confirm to the user that it is receiving power and is active. The relays RY1 and RY2 are then turned ON, providing AC line voltage to one or two appliances connected to sockets Load 1 and Load 2.

The microcontroller U1 senses if a cable is connected to jack J1 on pins 1 and 2 through a pull-up resistor R8. If the signal to pin 2 of microcontroller U1 is a logic HIGH, the unit will shut off the loads via Ry1 and RY2 within a few seconds and generate a pattern of one beep for 2 seconds followed by 2 seconds of silence then repeat to indicate that no cable is connected between the Appliance Control and the Bottle Water Dispenser. If the cable and Dispenser are connected, a logic LOW is presented to pin 2 of U1 and the buzzer is silent while both relays RY1 and RY2 supply power to their respective loads.

When the bottle water dispensing system runs low on water, it produces a signal of almost 12 VDC on pin 4 of J1. This signal is sensed by pin 4 of U1, which begins a timeout sequence of 30 seconds. If the signal goes back LOW, the timeout sequence resets. If the signal remains HIGH for 30 seconds, the unit will disconnect power to both AC loads via RY/RY2 and the audible alarm will produce 2 beeps lasting ½ second each followed by a dead time of 2 seconds. If the float signal recovers as a result of re-filling the bottle water tank(s), the unit will automatically reset, shutting OFF the alarm buzzer and reenergizing the 2 AC loads.

The unit is constantly monitoring the current consumed by the load via AC current sensing transformer L1. The sensing is magnetically coupled via the "hot" wire running inside of a U-core transformer. The transformer produces an isolated low voltage AC signal on its secondary that is rectified by D1 and filtered by C6. Resistor R10 provides constant impedance for the transformer. This DC signal is fed to pin 7 on the microcontroller, which internally connects to and ADC converter. This analog signal is converted to a digital value that is compared with a preset value corresponding to 30 amps. If this value is exceeded for a short time, the microcontroller U1 will disconnect both loads via RY1 and RY2. It also produces an audible alarm signals consisting of 3½ second beeps followed by 1 second of silence. The only way to reset this condition is to remove AC power from the entire unit for a period of not less than 10 seconds.

If a cable is connected from J2 of the first controller to J1 of a second controller, the signal from output of the first controller box is connected to the input to the second controller box. This allows controllers to be "daisy-chained" such that 4, 6, 8, etc. 15 amp appliances can be controlled from one bottle water dispenser.

Figure 2B:
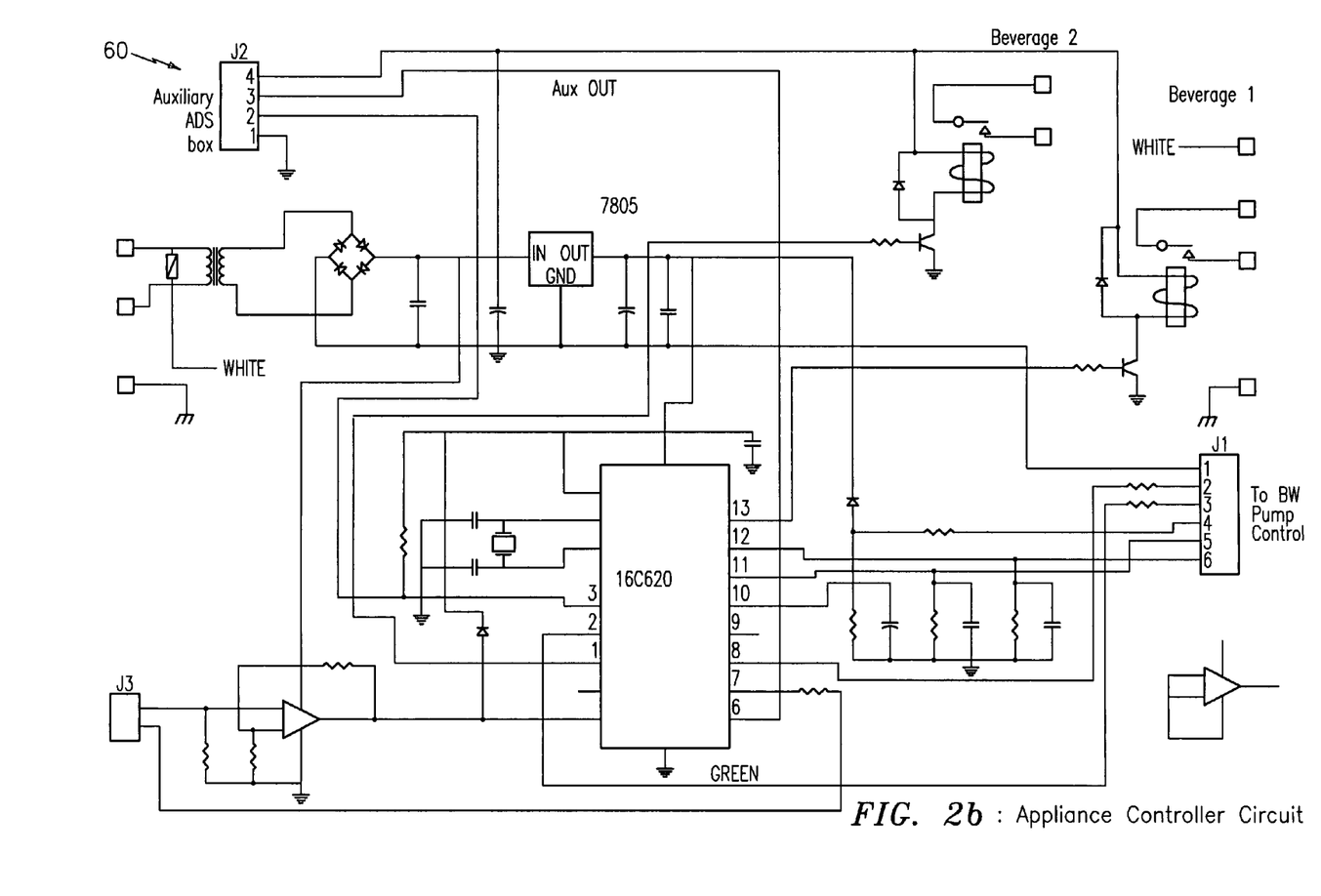
FIG. 2b is another circuit diagram of a controller module according to some embodiments of the present invention that forms part of the appliance controller shown in FIG. 1a or 1b.

FIG. 2b

FIG. 2b shows a schematic of another example of a circuit module for implementing the functionality of the appliance controller.

As shown, the circuit module consists of a single chip 8-bit microcontroller U1, a power supply to convert 120 50/60 HZ AC to a low voltage 18 and 5 VDC through a high isolation transformer TR1 and rectifier bridge BR1. The microcontroller controls two 30 amp AC loads via relays RY1 and RY2, which also isolate the AC load from the low voltage DC control circuit.

The unit powers up with a delay of about 5 seconds before turning RY1 and RY2 ON. With no connection to a beverage pump, the loads are ON continuously. If a connection to a float switch system is made via J1, J1 pin 4 connects to an input protected by R8, R11 and D4 to prevent transient and static damage to the microcontroller. With a voltage of between 5 and 18 Volts DC is applied to J1 pin 4, both outputs RY1 and RY2 are shut OFF. Normally this signal is from a water float valve indicating the tank is EMPTY, hence the beverage appliance controlled by this device is then, and only then, disabled.

Multiple devices may be connected remotely by "daisy chaining" the output from J2 pin 3 to another device via J1 pin 4. Isolated grounds are connected via J2 pin 1 and J1 pin 1. Again, with no float signal applied or no cable connected the high current relays turn ON their loads. When the first device in the chain detects the "empty bottle", it enables the AUX output signal on J2 pin 3. This signal connects to box "N" in the chain via J1 pin 4 and causes both of its outlets to turn OFF. There is no limit to the number of boxes that can be theoretically daisy-chained, only the available AC power for the local appliances.

Other Implementations of the Functionality of the Appliance Controller

The scope of the invention is not intended to be limited to the specific implementation of the circuit module shown in FIG. 2a or 2b in order to provide the functionality of the appliance controller. For example, embodiments are envisioned in which other circuit arrangements using other circuit components either now known or later developed in the future that may be used to achieve the desired functionality of the appliance controller.

Further, consistent with that described herein, the functionality of the appliance controller may be implemented using other configurations of hardware, software, firmware, or a combination thereof, although the scope of the invention is not intended to be limited to any particular embodiment thereof. In a typical software implementation, the appliance controller may include one or more microprocessor-based architectures having a microprocessor or microcontroller, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology now known or later developed in the future. Moreover, the scope of the invention is intended to include the circuit module being a standalone modules, as shown, or in the combination with other circuitry for implementing another module.

Figure 3:
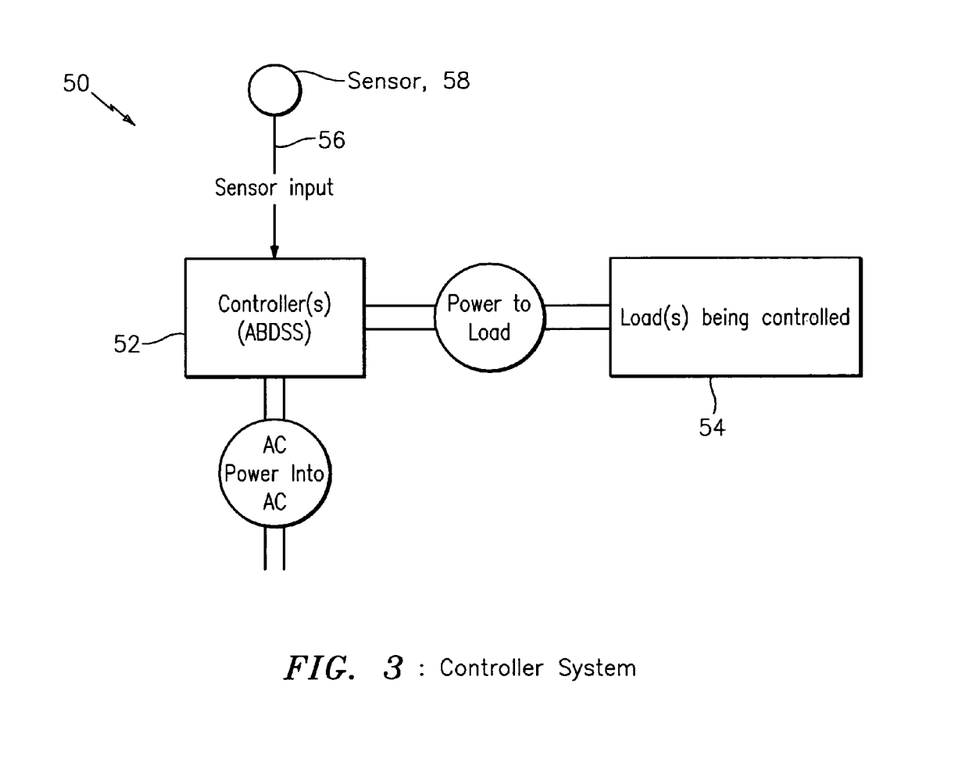
FIG. 3 shows a controller system having a controller according to some embodiments of the present invention.

FIG. 3: A Controller System

FIG. 3 shows a controller system generally indicated 50 having a controller 52 according to the present invention featuring one or more modules configured for providing power to a load 54 being controlled by the controller 52, for receiving a sensor input along line 56, e.g. from a sensor such as element 58, containing information about one or more operational parameters of the load 54 being controlled, and for disconnecting the power to the load 54 being controlled.

In one embodiment consistent with that described above, the load 54 being controlled may take the form of an appliance receiving fluid from a fluid supply system; and the sensor input may include a fluid supply system signal indicating that fluid is not being provided to the appliance, and for disconnecting the power to the appliance. Embodiments are also envisioned where the load being controlled may be, e.g., an attic fan or other remotely located device that may stop working unbeknownst to the homeowner. In such cases, the controller would sense that the attic fan is not working properly and disconnect the power to be same. The controller may also sound an alarm consistent with that described above.

In one embodiment consistent with that described above, the one or more modules may take the form of a controller circuit featuring a first circuit part configured for providing the power to the appliance that receives the fluid from the fluid supply system; and a second circuit part configured for receiving the fluid supply system signal indicating that the fluid is not being provided to the appliance and disconnecting the power to the appliance.

It is important to note that the scope of the invention is not intended to be limited to the type or kind of load being controlled, and that embodiments are envisioned for controlling other types of loads besides appliance, including loads both now known and later developed in the future.

Further, it is important to note that the scope of the invention is not intended to be limited to the manner or technique for sensing information about the one or more operational parameters of the load 54, or the type or kind of sensor being used to sense such parameters, and that the scope of the invention is intended to include sensing such parameters using techniques both now known and later developed in the future.

List All Possible Applications

Beverage systems, fluid dispensing systems, water supply systems; any system in which there is a supply system, reservoir and dispensing system, In commercial applications where there is a supply of either water or any other fluid to an appliance, whereas fluid level or presence is detected by any sensing means or mechanism, car wash, ware wash, cisterns, septic tanks, and any other applicable application that requires level sensing.

What is claimed is:

1. An appliance controller comprising:
    a first circuit part configured for providing power to an appliance dispensing system that receives fluid from a fluid supply system and dispenses the fluid;
    a second circuit part configured for receiving from the fluid supply system a fluid supply system signal indicating that the fluid is not being provided to the appliance dispensing system, and for disconnecting the power to the appliance dispensing system based at least partly on the fluid supply system signal received, so that the appliance dispensing system will not continue to operate when the fluid being dispensed is no longer being provided; and
    a third circuit part configured for daisy chaining the appliance controller circuit to another appliance controller circuit coupled to another appliance dispensing system.

2. An appliance controller according to claim 1, wherein the third circuit part is responsive to one fluid supply system signal and provides a daisy-chained fluid supply system signal to the another appliance controller.

3. An appliance controller according to claim 1, wherein the appliance controller circuit has a fourth circuit part that provides an alarm indicating that the appliance dispensing system has been disconnected.

4. An appliance controller system, comprising:
    a fluid supply system configured for providing fluid from a fluid supply to an appliance dispensing system, for sensing that the fluid supply is below a predetermined threshold and for providing a fluid supply system signal indicating that no fluid is being provided to the appliance dispensing system; and
    an appliance controller having a first circuit part configured for providing power to the appliance dispensing system, having a second circuit part configured for receiving the fluid supply system signal and for disconnecting the power to the appliance dispensing system based at least partly on the fluid supply system signal received, so that the appliance dispensing system will not continue to operate when the fluid being dispensed is no longer being provided, and having a third circuit part configured for daisy chaining the appliance controller circuit to another appliance controller circuit coupled to another appliance dispensing system.

5. An appliance controller system according to claim 4, wherein the third circuit part is responsive to one fluid supply system signal and provides a daisy-chained fluid supply system signal to the another appliance controller.

6. An appliance controller system according to claim 4, wherein the appliance controller circuit has a fourth circuit part that provides an alarm indicating that the appliance dispensing system has been disconnected.

7. An appliance controller system according to claim 4, wherein the fluid supply system includes a sensor that responds to the fluid supply system being below the predetermined threshold and provides the fluid supply system signal.

8. An appliance controller system according to claim 4, wherein the appliance controller provides power to the appliance for turning the appliance dispensing system on and off.

9. An appliance controller system comprising:
    a fluid supply system configured for providing fluid from a fluid supply to an appliance dispensing system, for sensing that the fluid supply is below a predetermined threshold and for providing a fluid supply system signal indicating that no fluid is being provided to the appliance dispensing system; and a plurality of appliance controllers, each appliance controller configured for responding to the fluid supply system signal and for disconnecting the power to the appliance dispensing system based at least partly on the fluid supply system signal received, so that the appliance dispensing system will not continue to operate when the fluid being dispensed is no longer being provided, each appliance controller being coupled to a respective appliance dispensing system.

10. An appliance controller system according to claim 9, wherein the plurality of appliance controllers are daisy chained together so that only one appliance controller is connected to the fluid dispensing system.

11. An appliance controller system according to claim 10, wherein the one appliance controller is responsive to one fluid supply system signal and provides a daisy-chained fluid supply system signal to a next appliance controller.

12. A method comprising:
providing with a first circuit part power to an appliance dispensing system that receives fluid from a fluid supply system;

receiving with a second circuit part from the fluid supply system a fluid supply system signal indicating that the fluid is not being provided to the appliance dispensing system and disconnecting the power to the appliance dispensing system based at least partly on the fluid supply system signal received, so that the appliance dispensing system will not continue to operate when the fluid being dispensed is no longer being provided; and daisy chaining with a third circuit part the appliance controller circuit to another appliance controller circuit coupled to another appliance dispensing system.

* * * * *